United States Patent
Singh et al.

(10) Patent No.: US 9,037,727 B2
(45) Date of Patent: May 19, 2015

(54) CAPABILITY GRABBING PEER DEVICE FUNCTIONALITY IN SIP

(75) Inventors: Kuldeep Singh, Gurgaon (IN); Durgesh Mishra, Noida Uttar Pradesh (IN); Seetharaman Swaminathan, Tamil Nadu (IN); Ananthakrishnan Sujatha, Chennai (IN)

(73) Assignee: Alcatel Lucent, Boulogne-Billancourt (FR)

( * ) Notice: Subject to any disclaimer, the term of this patent is extended or adjusted under 35 U.S.C. 154(b) by 71 days.

(21) Appl. No.: 13/000,778

(22) PCT Filed: Jun. 27, 2008

(86) PCT No.: PCT/EP2008/058282
§ 371 (c)(1),
(2), (4) Date: Jul. 21, 2011

(87) PCT Pub. No.: WO2009/155989
PCT Pub. Date: Dec. 30, 2009

(65) Prior Publication Data
US 2011/0270993 A1 Nov. 3, 2011

(51) Int. Cl.
*G06F 15/16* (2006.01)
*H04L 29/06* (2006.01)

(52) U.S. Cl.
CPC ............. *H04L 65/40* (2013.01); *H04L 65/1006* (2013.01)

(58) Field of Classification Search
CPC ............................ H04L 65/40; H04L 65/1006
USPC ......................... 370/503; 455/414.1; 709/227
See application file for complete search history.

(56) References Cited

U.S. PATENT DOCUMENTS

| | | | |
|---|---|---|---|
| 7,840,681 B2 * | 11/2010 | Acharya et al. | 709/227 |
| 2005/0243990 A1 * | 11/2005 | Vonk | 379/210.01 |
| 2008/0137690 A1 * | 6/2008 | Krantz et al. | 370/503 |
| 2009/0286516 A1 * | 11/2009 | Sedlacek et al. | 455/414.1 |

OTHER PUBLICATIONS

IETF RFC 3515, The SIP Refer Method, Apr. 2003, 1-22.*
IETF RFC 4508, Conveying Feature Tags with the SIP REFER Method, May 2006, 1-5.*
IETF Draft-IETF-SIPPING-Multiple-Refer-06, Refering to Multiple Resources in the SIP, Jun. 22, 2006, 1-10.*
Peng, SSIP—Split a SIP Session Over Multiple Devies, Jun. 2005, 1-54.*
Peng, SSIP—Split a SIP Session Over Multiple Devices, Jun. 2005, 1-54.*
Student: Chen-Jui Peng Advisor: Ren-Hung Hwang: "SSIP: Split a SIP Session Over Multiple Devices," Internet Citation, [Online], pp. 1-45, XP007904234 retrieved on Mar. 4, 2008.

(Continued)

*Primary Examiner* — Jung Park
*Assistant Examiner* — Albert Shih
(74) *Attorney, Agent, or Firm* — Fay Sharpe LLP (57) ABSTRACT

A method for enhancing the capability grabbing peer device functionality in Session Initiation Protocol (SIP) is disclosed. The method includes associating a session originating from a first terminal (101) to a second terminal (102) with a session originating from the first terminal to third terminal (103) using a Session Initiation Protocol REFER operation (205). The Call-ID header of the first session and the 'cgpd' feature tag may be used in the REFER message to associate the first session Invite Delta with the third session. Session Description Protocol (SDP) is used for conveying media to be transferred synchronously to the third terminal.

12 Claims, 6 Drawing Sheets (56) References Cited

OTHER PUBLICATIONS

3GPP: "3rd Generation Partnership Project; Technical Specification Group Services and Architecture; Feasibility Study on Multimedia Session Continuity; Stage 2 (Release 8)," vol. TSG SA, No. Prague, Czech Republic; pp. 1-63, XP050211170, Jun. 2, 2008.

Shacham H. Schulzrinne Columbia University S. Thakolsri W Kellerer Docomo Euro-Labs R: "Session Initiation Protocol (SIP) Session Mobility; draft-shacham-sipping-session-mobility-05.text," Internet Engineering Task Force, pp. 1-39, XP015059890, Nov. 18, 2007.

Loreto G. Camarillo Ericsson S.: "The Session Initiation Protocol (SIP) Dialog Correlation; draft-loreto-sipping-dialog-correlation-01.txt," Internet Engineering Task Force, pp. 1-16, XP015045648, Jun. 25, 2006.

Teodora Guenkova-Luy et al.: "Service Mobility with SIP, SDP and MPEG-21," Telecommunications, 2007, 9th International Conference on, IEEE, PI, pp. 293-300, XP031113737, Jun. 1, 2007.

International Search Report for PCT/EP2008/058282 dated Jun. 22, 2009.

* cited by examiner

CAPABILITY GRABBING PEER DEVICE FUNCTIONALITY IN SIP

BACKGROUND

1. Technical Field

The embodiments disclosed herein generally relate to Session Initiation protocol (SIP) functionality, and, more particularly, to a method for enhancing SIP functionality to integrate media capabilities of end terminals.

2. Description of the Related Art

There are many high-end phone terminals (Session Initiation Protocol (SIP)/IP. Media Subsystems (IMS) hardphones, softphones, cellular phones and so on) available in market. There exists no mechanism for a relatively unsophisticated terminal to have extra functions to be devolved to other capable terminals. For example, a calling terminal, terminal A with audio and video capabilities cannot perform the task of video exchange with the called terminal, terminal B which has audio capability but does not have video capability, and, in no way (at present), terminal B can devolve the task of video exchange to another video-capable terminal. Hence, it is not possible to aggregate media capabilities of various unsophisticated terminals and converse with high-end terminals.

The Session Initiation Protocol (SIP) exploits an application-level control protocol for setting up, changing and terminating multimedia sessions between participants on IP data networks. SIP can enable a range of services, such as Internet telephony, multimedia conferencing, registration and redirection services, simplifies connecting to VPNs, etc.

Generally, SIP functionality might not allow redirection of some particular type of media to other terminals. For instance, there can be two sessions at terminal A, one between A and B and the other between A and C. But present SIP terminal implementations treat the two sessions originating from terminal A as two different sessions. Thus, media sharing between two sessions is not possible and hence the sessions need to be switched i.e. one session at a time can only use the media I/O of the terminal.

Session Description Protocol (SDP) negotiation is a solution put forward to address the problem of media sharing. Usually, SDP negotiation is implemented on behalf of a terminal (for example, terminal C) and this implementation requires prior knowledge of IP address of the terminal to which selected media need to be redirected. For example, if terminal B is assured that terminal C can handle SDP, then terminal B can respond to terminal A, including the SDP for terminal C.

However, the aforementioned method has the drawback of limiting the mobility of the user. A further drawback of the aforementioned method is that the IP address of an allocated terminal may change frequently. Also, it is not possible for multiple SIP terminals to receive the same media simultaneously. Furthermore, an application server infrastructure needs to be installed for signaling on behalf of a terminal.

SUMMARY

In view of the foregoing, an embodiment herein provides a method of associating a session originating from a first terminal to a second terminal with the associated session originating from the first terminal to a third terminal, wherein the method comprises of initiating a session with the second terminal by the first terminal, accepting the session by the second terminal, second terminal sending a request to the first terminal for associating the session with the third terminal, first terminal accepting the request from the second terminal, first terminal initiating an associated session with the third terminal using an INVITE operation; and the associated session being accepted by the third terminal.

In another embodiment disclosed herein, the second and third terminals have a single Address of Record (AoR).

In another embodiment, a Session Initiation Protocol (SIP) REFER operation is used to associate the sessions, and the Content-Length and Content-Type of the REFER operation is as per IETF. RFC 3515.

In another embodiment, the method uses a feature tag and a Call-ID field to associate the sessions and the feature tag is used with Refer-To header of the REFER message.

In another embodiment, the second terminal consults multiple associated terminals to learn the Session Description Protocol (SDP) of the associated terminals and selects the most optimum terminal as the third terminal.

In another embodiment, the second terminal inserts Globally Routable User Agent Uniform Resource Identification (GRUU) field of the third terminal in the request to point to the third terminal.

In yet another embodiment, Session Description Protocol Session (SDP) as part of the body of the REFER method is used to convey delta SDP to be used for initiating dialog with third terminal.

In further embodiments, GRUU is inserted by the second terminal if GRUU is self-made, and the pre-stored GRUU is inserted by the second terminal if the GRUU is network generated or if the third terminal belongs to a different user.

Moreover, in another embodiment disclosed herein, the first terminal initiates the session with the third terminal automatically, or on reception of an indication from user of the first terminal. The indication from the user of the first terminal is in the form of a confirmation or assent.

Moreover, in another embodiment disclosed herein, a terminal capable of associating a session originating from the terminal to a second terminal with a second session originating from the terminal to a third terminal, the terminal comprising of a means to read a feature tag and CALL-ID fields; a means to initiate an associated session with the third terminal on reading the feature tag and the CALL-ID fields; and a means to transfer media synchronously between the associated sessions.

These and other aspects of the embodiments disclosed herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments disclosed herein without departing from the spirit thereof, and the embodiments disclosed herein include all such modifications.

BRIEF DESCRIPTION OF THE DRAWINGS

The embodiments disclosed herein will be better understood from the following detailed description with reference to the drawings, in which.

DETAILED DESCRIPTION OF PREFERRED EMBODIMENTS

The embodiments disclosed herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments disclosed herein. The examples used herein are intended merely to facilitate an understanding of ways in which the embodiments disclosed herein may be practiced and to further enable those of skill in the art to practice the embodiments disclosed herein. Accordingly, the examples should not be construed as limiting the scope of the embodiments disclosed herein.

The embodiments disclosed herein achieve a method to enhance the SIP functionality by providing a method to integrate media capabilities of the terminals. Referring now to the drawings, and more particularly to FIGS. 1 through 6, where similar reference characters denote corresponding features consistently throughout the figures, there are shown preferred embodiments.

Figure 1:
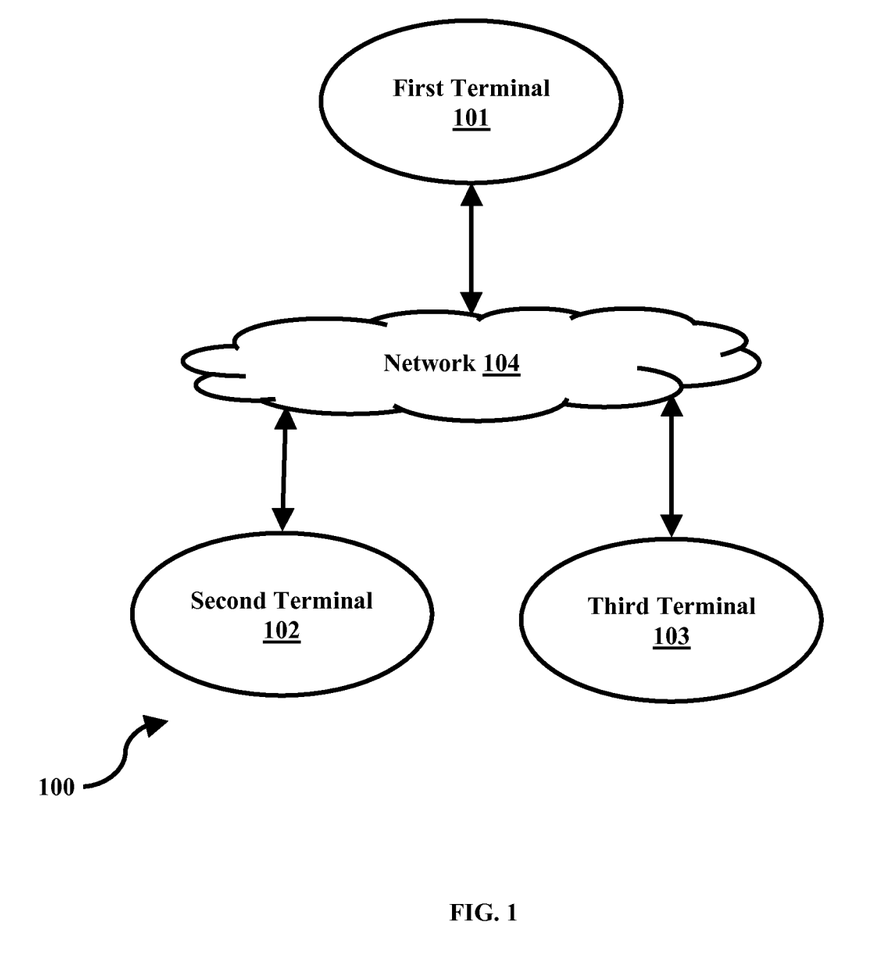
FIG. 1 is a block diagram illustrating the environment of the invention.

FIG. 1 is a block diagram 100 illustrating the environment of the invention. The first terminal 101 initiates a session with the second terminal 102 using a network 104. The network of first terminal and second terminal may belong to same network or different networks and network 104 may be an amalgamation of multiple networks. The second terminal 102 accepts the session and subsequently, sends a REFER request to first terminal 101 for associating the session with a third terminal 103. The first terminal 101 accepts the REFER request from the second terminal 102 and initiates an associated session with the third terminal 103 using an INVITE operation. The first terminal 101 uses delta SDP received in the REFER from second terminal 102 to negotiate with third terminal 103 and session between first terminal 101 and second terminal 102 continues in parallel with the associated session owing to REFER with the same cgpd tag and the same call-id of the session between first and second terminal.

Figure 2:
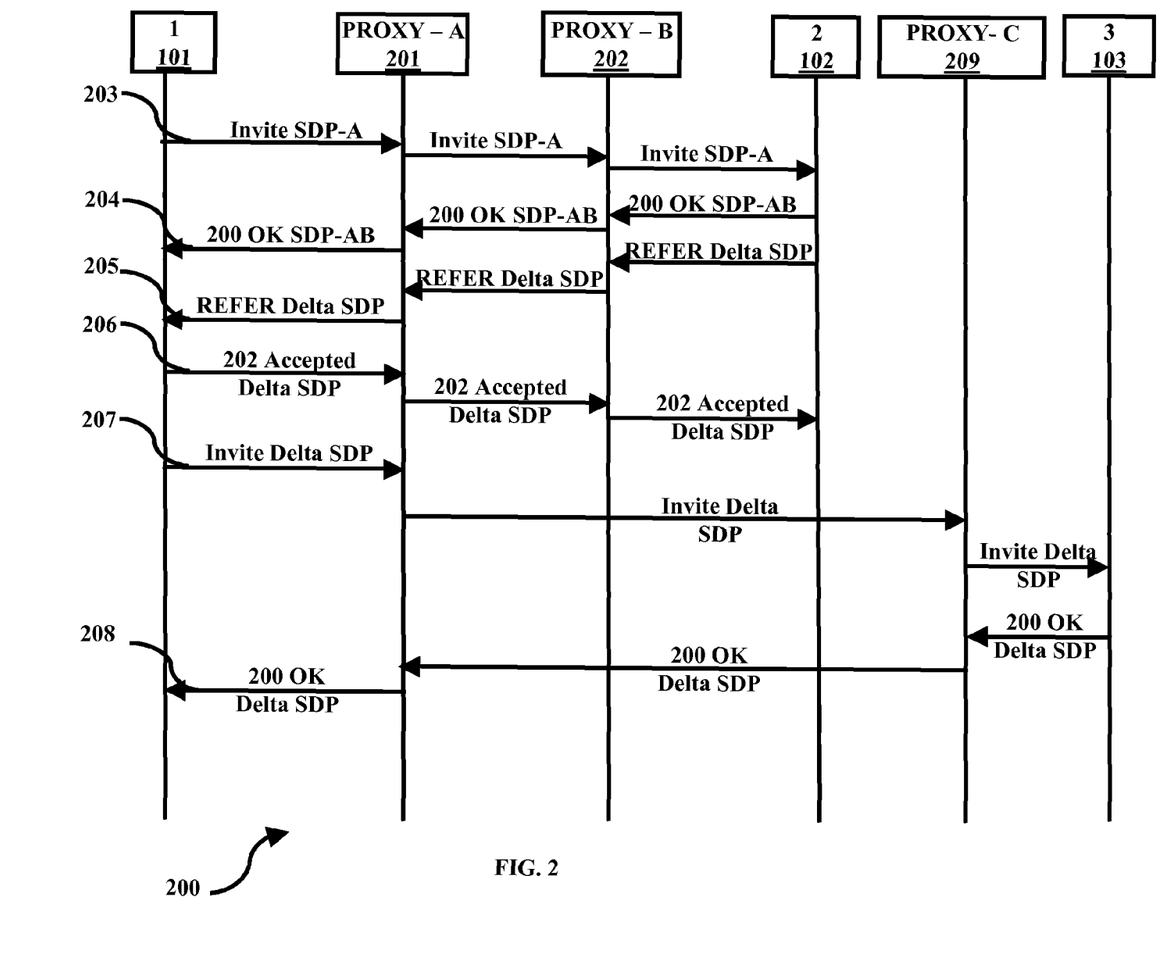
FIG. 2 illustrates a schematic diagram depicting SDP negotiation between user terminals.

FIG. 2 illustrates a schematic diagram 200 depicting SDP negotiation between user terminals. The first terminal 101 initiates a session with the second terminal 102 by sending an INVITE 203 with SDP to the second terminal 102 via Proxy-A 201 and Proxy-B 202. The second terminal 102 accepts the session and sends a 200-OK 204. The second terminal can then request the first terminal 101 to associate the session with another session between the first terminal 101, and a third terminal 103 either by pre-stored settings or by a user interaction. The user interaction can take the form of an indication, where the indication could be in the form of a confirmation or assent from the user. Further, the second terminal 102 sends a REFER 205 with Delta SDP as a request to the first terminal 101 to associate the session with the third terminal 103. The first terminal 101 accepts the request and sends the 202 Accepted response 206 with the selected delta SDP body. After successful selection of SDP body in the received REFER 206, the first terminal 101 sends an INVITE 207 with delta SDP through Proxy-C 209. The third terminal 103 accepts the associated session and sends a 200 OK 208 with the accepted-Delta SDP to the first terminal 101.

Figure 3:
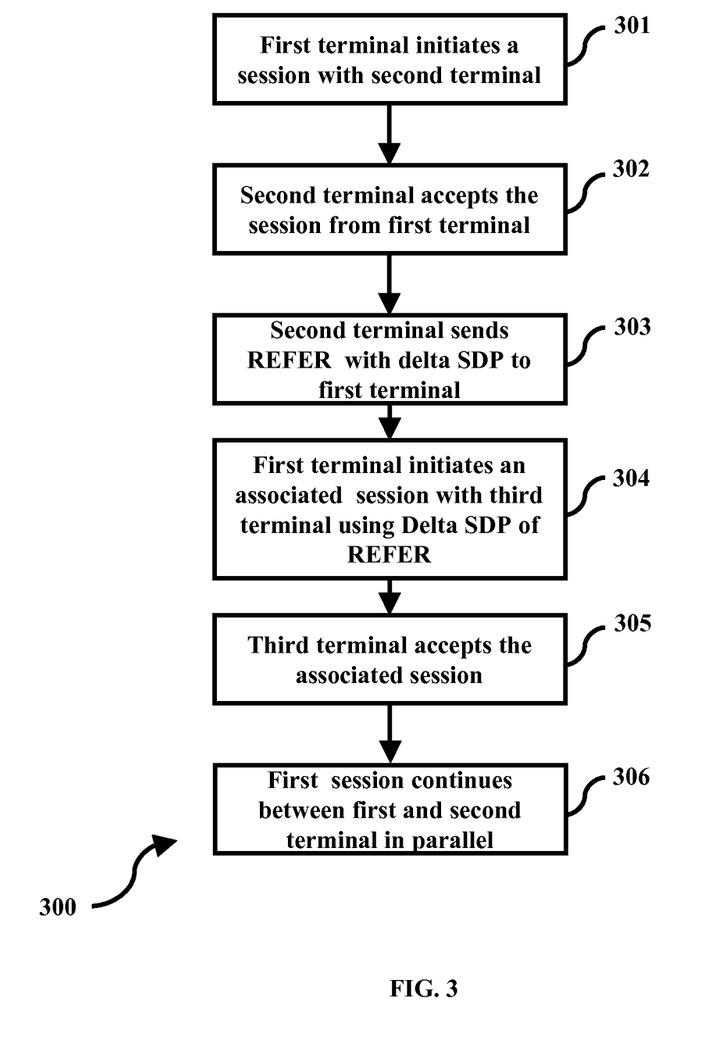
FIG. 3 illustrates a flowchart depicting a method of basic CGPD implementation, according to the embodiments disclosed herein.

FIG. 3 illustrates a flowchart depicting a method of basic CGPD implementation, according to embodiments herein. The first terminal 101 initiates (301) a session with the second terminal 102. The second terminal 102 accepts (302) the session request from the first terminal 101 (by sending a 200-OK response), and subsequently sends (303) a REFER request with Delta SDP, with the same call id as the first session, and the cgpd tag to the first terminal 101 for associating the session with the third terminal 103. The first terminal 101 then initiates (304) a new session with the third terminal 103 using the Delta SDP of REFER. The third terminal 103 accepts (305) the session and the session between the first terminal and the second terminal continue (306) in parallel, with media being sent synchronously to the third terminal 103 also. The various actions in method 300 may be performed in the order presented, in a different order or simultaneously. Further, in some embodiments, some actions listed in FIG. 3 may be omitted.

Figure 4:
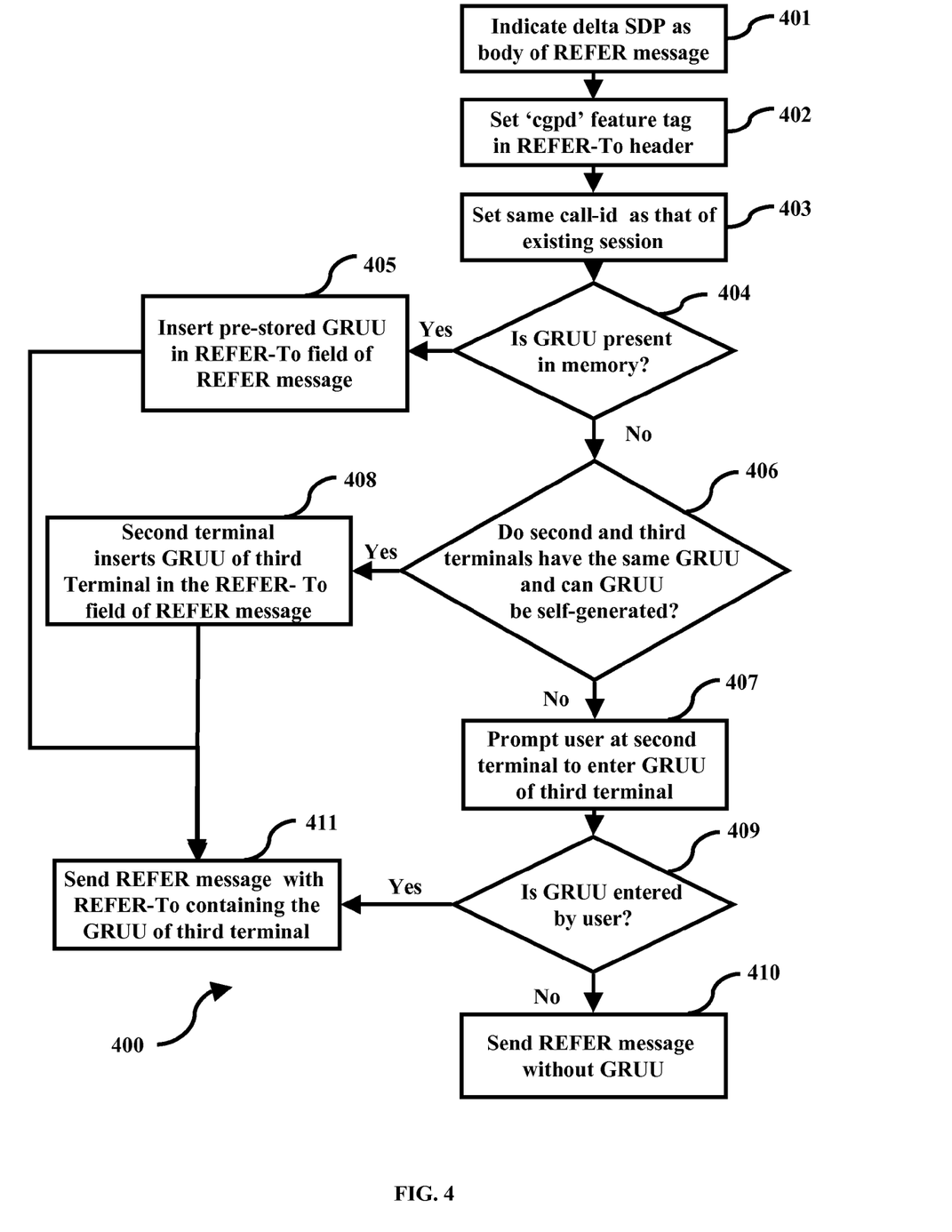
FIG. 4 illustrates a flowchart depicting a method of Non-consultative CGPD implementation, according to the embodiments disclosed herein.

FIG. 4 illustrates a flowchart depicting a method of Non-consultative CGPD implementation, according to embodiments herein. The second terminal 102 indicates (401) delta SDP which may be the subset of media supported by first terminal in the body of REFER message and sets (402) 'cgpd' feature tag in Refer-To header. The second terminal 102 sets (403) call-id, which is the same as the existing session between the first terminal 101 and second terminal 102. A check is made (404) by the second terminal 102 to check if GRUU of the third terminal 103 (to which the capability is being devolved by the second terminal) is present in the memory of the second terminal 102. If GRUU is present in memory of the second terminal 102, then the pre-stored GRUU from the memory of second terminal 102 is inserted (405) in the Refer-To field of REFER message and the REFER message is sent (411) to the first terminal. If the GRUU is not present in the memory, then a further check (406) is made to check if the second terminal 102 and the third terminal 103 have the same AoR and is the GRUU self-generated. If the terminals are of same AoR and GRUU is self-generated, then the second terminal 102 generates and inserts (408) GRUU in the Refer-To field of REFER message and sends the REFER message (411) to the first terminal. If the terminals do not have the same AoR or if the GRUU is not self-generated (i.e., it is network generated), then the user at the second terminal 102 is prompted (407) to enter the GRUU of the third terminal. A further check is performed to check (409) if the user at second terminal entered the GRUU or not. If the user does not enter the GRUU, then REFER message is sent (410) without the GRUU. If the user enters GRUU, then the second terminal 102 sends (411) the REFER message to the first terminal 101, where the REFER message contains the Refer-To field with the GRUU of the third terminal 103. The various actions in method 400 may be performed in the order presented, in a different order or simultaneously. Further, in some embodiments, some actions listed in FIG. 4 may be omitted.

Figure 5:
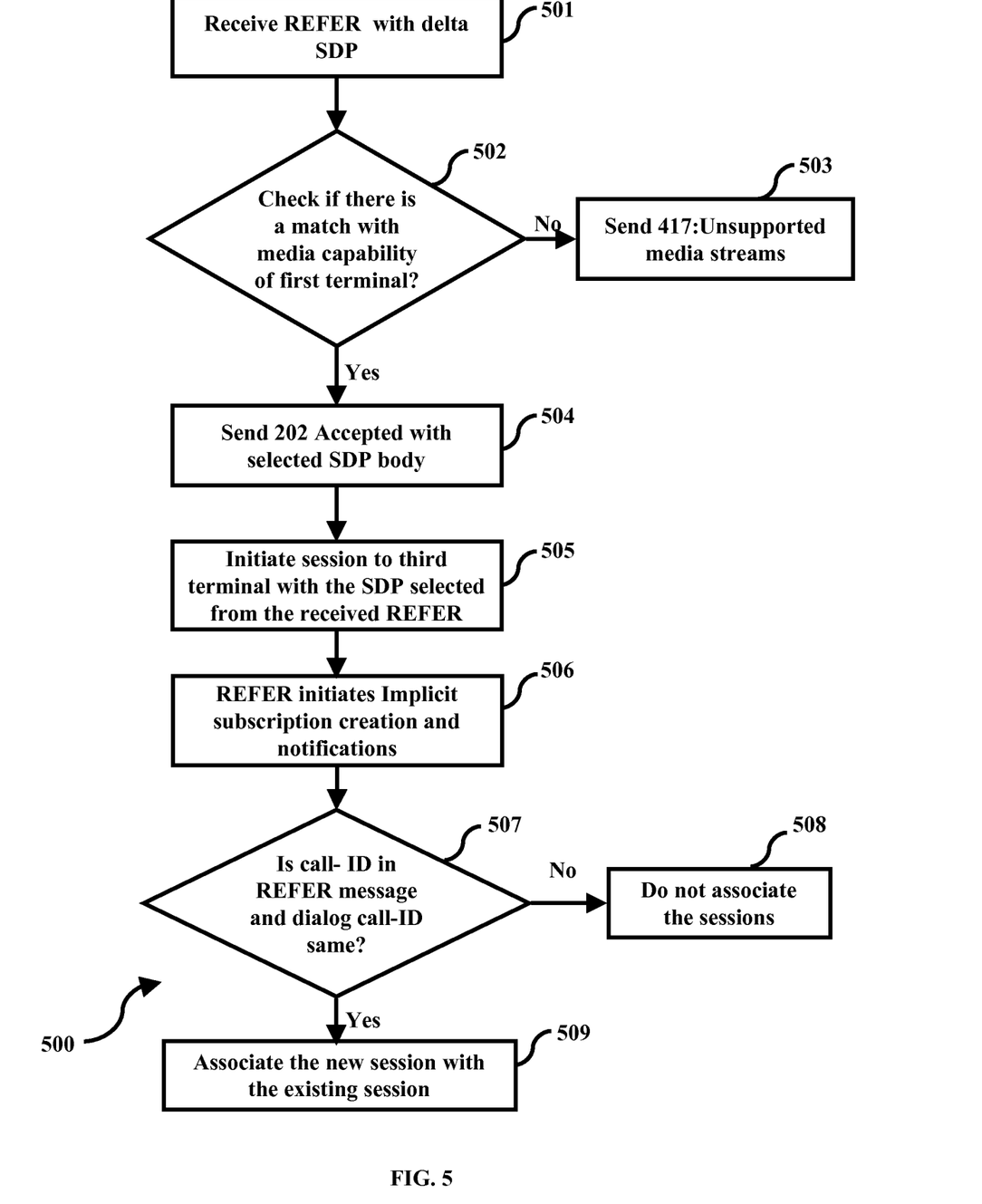
FIG. 5 illustrates a flowchart depicting a method of receiving REFER message in CGPD implementation, according to the embodiments disclosed herein.

FIG. 5 illustrates a flowchart depicting a method of receiving REFER message in CGPD implementation, according to embodiments herein. The first terminal 101 receives (501) REFER with delta SDP from the second terminal 102 and checks (502) if there is a match with media capability of first terminal 101. If SDP does not match with any of the media capabilities supported by the first terminal 101, the first terminal 101 sends (503) status code 417: Unsupported media streams to the second terminal 102 and the sharing of the media with the third terminal 103 will not occur. If the delta SDP matches with the media capabilities supported by the first terminal 101, the first terminal 101 sends (504) 202 Accepted with the selected SDP body to the second terminal 102. The SDP can match completely or partially with the media capabilities supported by the first terminal 101. First terminal 101 then initiates (505) the session with the third terminal 103 with the SDP selected from the received REFER. Further, REFER initiates (506) implicit subscription creation and notifications (as described in IETF. RFC 3515). First terminal 101 then checks (507) if CALL-ID in the REFER message is same as the existing session dialog CALL-ID. If the CALL-ID is same, then a new session is associated (509) with the existing session and resources are shared between the sessions. If the CALL-ID is not same, then the new session is not associated (508) with the existing session. The various actions in method 500 may be performed in the order presented, in a different order or simultaneously. Further, in some embodiments, some actions listed in FIG. 5 may be omitted.

Figure 6:
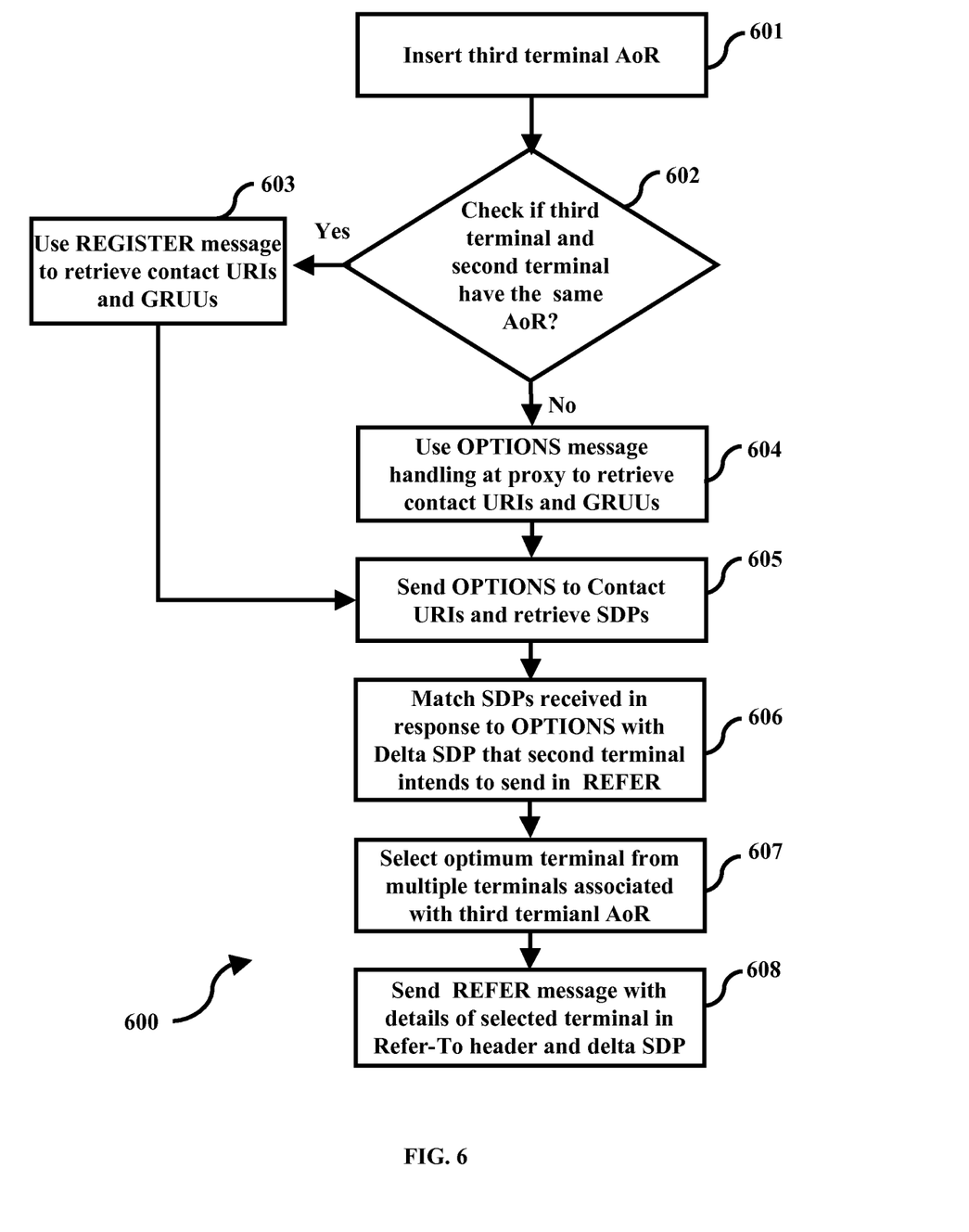
FIG. 6 illustrates a flowchart depicting a method of implementing consultative CGPD, according to the embodiments disclosed herein.

FIG. 6 illustrates a flowchart depicting a method of implementing consultative CGPD, according to embodiments herein. Check (602) if the third terminal 103 and the second terminal 102 belong to two terminals of same AoR. If AoR is same, then REGISTER message is used (603) to retrieve the list of Contact URIs and corresponding GRUU attached to the AoR. If the AoR is not same, use (604) OPTIONS message to retrieve the list of contact URIs and corresponding GRUUs of the third terminal 103. The proxy returns a 3xx direction response in reply to the OPTIONS message sent by terminal 2, where the 3xx direction response comprises of the contact URIs and the corresponding GRUUs of the third terminal. The first terminal 101 then sends (605) individual OPTIONS to all the contact URIs and retrieves the SDPs. Thereafter, the first terminal matches (606) the SDPs received in the response to the OPTIONS with the Delta SDP that the second terminal intends to send in the REFER and selects (607) optimum terminal from multiple terminals associated with third terminal AoR. Further, the second terminal 102 sends (608) REFER message with the details of the selected optimum terminal in the Refer-To header and the delta SDP in the body of the REFER. The various actions in method 600 may be performed in the order presented, in a different order or simultaneously. Further, in some embodiments, some actions listed in FIG. 6 may be omitted.

In consultative CGPD, multiple terminals may be associated with the REREREd AoR, when the second terminal 102 inserts the AoR of the third terminal 103. For example, Home PC softphone, Office softphone and Mobile softphone can be associated with same AoR. Sending REFER from the AoR implies CGPD assistance can be sought from any of the terminals. However, if Home PC softphone may have video capability but the mobile softphone may not have the same feature, then prior consultation of all terminals are required for correct functioning of CGPD. If CGPD is with same user, for instance, the third terminal 103 and the second terminal 102 belong to two terminals of same AoR i.e. the user is trying to devolve the responsibility of retrieving all the contact URIs and GRUUs to one of the terminals, REGISTER message can be used to retrieve the list of all the contact URIs and corresponding GRUUs attached to the AoR. The send terminal 102 then sends an OPTIONS message to each contact URI's to retrieve the SDP's. The OPTIONS request should contain the Accept header fields with "application/sdp" as these results in the response containing the SDP info. The SDPs are matched with delta SDP to find the most optimum contact URI for sending REFER message. If the user selects a particular terminal (AoR+GRUU) then SDP matching may be used to determine that the third terminal 103 is capable of the required functionality. The Delta SDP information may also be conveyed in the feature tags as described in RFC 3840 and their use in REFER If the third terminal 103 is not the same as the second terminal 102 then OPTIONS message handling at the proxy is required to be evolved and if the proxy determines that the AoR addressed in OPTIONS header posseses many bindings, then it should return 3xx redirection response including all the contact URIs and corresponding GRUUs of the third terminal 103. The second terminal 102 then sends individual OPTIONS to all the contact URIs and retrieves the corresponding SDPs. The second terminal user agent matches the SDPs and finds out the optimum terminal before sending the REFER message and also determines the capabilities of the selected terminal.

Embodiments herein also provide an SDP capability determination means prior to sending REFER message to a terminal where the SDP of the third terminal is analyzed and matched against the delta SDP to assure that the third terminal can take up the associated session. The user is also permitted to choose the most capable terminal from the list of terminals associated with a particular AoR. Embodiments herein can be implemented by the use of existing OPTIONS message capability to retrieve the SDP of any terminal. The OPTIONS request may include the Accept header field with "application/sdp" and the GRUU of the REFFERed terminal. The GRUU may be used to address all the bindings to the same AoR. Embodiments herein can be employed both for Consultative CGPD with same user and with different user. The feature tags and the use of feature tags in REFER can be extended to convey the delta SDP information instead of transporting the delta SDP in the REFER message body as normal "application/sdp". The SDP capabilities in OPTIONS for consultative case can also be conveyed by use of extended feature tags in OPTIONS. It is obvious to a person skilled in the art that use of GRUU as such is not mandatory in the embodiments herein, any means for the second terminal to be able to identify the third terminal unambiguously, and convey the information regarding the identified third terminal to the first terminal may be used.

Embodiments herein include standardization potential with CGPD functionality as the base of multiple killer applications and provide end users with unsophisticated terminals to enhance media transferring to other terminals. Embodiments herein also provide an easy approach to intervene application servers that can correlate the REFER message and subsequent INVITE and applying flexible user charging for the service provider.

Embodiments herein also provide automatic SIP signaling to distinguish the third terminal. User mobility in Application Infrastructure Provider (AIP) network can be enabled by associating multiple terminals with same AoR and also provide an approach to receive the same media simultaneously by multiple SIP phones. Embodiments herein do not involve any Back-To-Back-User Agent (B2BUA) or Application server infrastructure installation for signaling.

Embodiments herein provide extension for various services to evolve. For example, User A calls from a high-end phone that has capability to transmit video as well as audio. But the User B may not have the video capability and the user can press flash button and the number of a User C. As a result, the video can be exchanged between User A and User C while a voice session is going on between User A and User B. Also provide is a method for parallel recording of the video from User A though User B has video capability. Further, media services such as diversion of game playing to SIP softphones where high end rendering and graphics is possible due to higher processing power are provided.

As can be appreciated, the embodiments herein allow the use of SIP. REFER operation for redirecting media to the third terminal by using REFER method with delta SDP in its body for conveying media synchronously to the third terminal and most importantly provides a basic infrastructure to enable numerous value added services.

Embodiments herein can take the form of an entirely hardware embodiment, an entirely software embodiment or an embodiment including both hardware and software elements. Embodiments that are implemented in software include but are not limited to, firmware, resident software, microcode, etc.

The list of structures corresponding to the claimed means is not exhaustive and that one skilled in the art understands that equivalent structures can be substituted for the recited structure without departing from the scope of the invention.

The foregoing description of the specific embodiments will so fully reveal the general nature of the embodiments disclosed herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments disclosed herein have been described in terms of preferred embodiments, those skilled in the art will recognize that the embodiments disclosed herein can be practiced with modification within the spirit and scope of the appended claims.

What is claimed is:

1. A method of associating a session originating from a first user terminal to a second user terminal with a second session originating from the first user terminal to a third user terminal, wherein the first user terminal initiates the session with the second user terminal, the method comprising:
   selecting via the second user terminal a third user terminal from among multiple user terminals associated with the second user terminal;
   consulting via the second user terminal multiple associated user terminals, associated with the third user terminal, for obtaining Session Description Protocol (SDP) details of the associated user terminals;
   inserting via the second user terminal Globally Routable User Agent Uniform Resource Identification (GRUU) field of the third user terminal in the Refer-To header in the request to point to the third user terminal;
   sending a request from the second user terminal to the first user terminal for associating the session with the second session between the first user terminal and the third user terminal;
   checking via the first user terminal the media capability of the first user terminal on receipt of the request from the second user terminal;
   accepting at the first user terminal the request from the second user terminal on finding a match between the request and media capability of the first user terminal;
   initiating at the first user terminal an associated session with the third user terminal using an INVITE message; and
   accepting at the third user terminal the associated session.

2. A method, as claimed in claim 1, wherein Session Description Protocol (SDP) present in the body of REFER message is used to convey partial media of the first user terminal to be used for initiating dialog with the third user terminal.

3. A method, as claimed in claim 1, wherein the first user terminal initiates the session with the third user terminal automatically with prior user settings.

4. A method, as claimed in claim 1, wherein the first user terminal initiates the session with the third user terminal on receiving an indication from user of the first user terminal.

5. A method, as claimed in claim 1, wherein the method uses a feature tag and a Call-ID field in the Session Initiation Protocol (SIP) REFER operation to associate the sessions.

6. A method, as claimed in claim 1, wherein Content-Length of the REFER operation is as per standard IETF RFC 3515.

7. A method, as claimed in claim 1, wherein Content-Type of the REFER operation is as per standard IETF RFC 3515.

8. A first user terminal adapted to initiate a first session originating from the first user terminal to a second user terminal with a second session originating from the first user terminal to a third user terminal, the first user terminal being configured to:
   receive a request from the second user terminal to associate the first session originating from the first user terminal to the second user terminal with the second session originating from the first user terminal to the third user terminal;
   check the media capability of the first user terminal on receipt of the request from the second user terminal;
   accept the request from the second user terminal on finding a match between the request and media capability of the first user terminal;
      wherein the acceptance from the first user terminal is forwarded to the second user terminal through a first proxy server and a second proxy server;
   initiate the second session with the third user terminal on accepting the request from the second user terminal, by sending an invite message to the third user terminal;
      wherein initiation includes sending the invite message to the third user terminal through the first proxy server and a third proxy server,
      wherein acceptance of the invite message by the third user terminal is received at the first user terminal through a third proxy server and the first proxy server; and
   transfer media synchronously between the sessions, on initiating the second session.

9. A second user terminal adapted to associate in an associated session with a third user terminal, the associated session being initiated by a first user terminal, wherein a session is existing between the first user terminal and the user second terminal, the second user terminal being configured to:
   select the third user terminal from a plurality of user terminals;
   send a request to the first user terminal for associating the existing session between the first user terminal and the second user terminal with a session between the first user terminal and the third user terminal;
   consult multiple associated user terminals, associated with the third user terminal, to obtain Session Description Protocol details of the associated user terminals; and
   insert Globally Routable User Agent Uniform Resource Identification field of the third user terminal in the Refer-To header in the request to the first user terminal for associating the existing session between the first user terminal and the second user terminal with a session between the first user terminal and the third user terminal, to point to the third user terminal; and send information about the third user terminal to the first user terminal, wherein the information about the third user terminal is sent to the second proxy server from the second user terminal and forward to the first user terminal through the first proxy server.

10. A first proxy server adapted to handle session description protocol messages between user terminals, the first proxy server being operative to:

receive and transmit invite and acceptance messages for initiating a multimedia session between a first user terminal and a second user terminal, where the invite and acceptance messages pass through a second proxy server, wherein a first invite message is received at the first proxy server and forwarded to the second user terminal through the second proxy server and an acceptance message is received at the second proxy server and forwarded to the first user terminal through the first proxy server;

receive and transmit request and acceptance messages between the first user terminal and second user terminal for associating the first multimedia session with a second multimedia session between the first user terminal and a third user terminal where the invite and acceptance messages pass through the second proxy server, wherein the request is received at the second proxy server and forwarded to the first user terminal through the first proxy server and the acceptance is received at the first proxy server and forwarded to the second user terminal through the second proxy server;

receive and transmit invite and acceptance messages between the first user terminal and the third user terminal for associating the multimedia session between the first user terminal and the second user terminal with the multimedia session between the first user terminal and the third user terminal, wherein the invite message is received at the first proxy server and forwarded to the third user terminal through a third proxy server and the acceptance is received at the third proxy server from the third user terminal and relayed to the first user terminal through the first proxy server; and transmit media synchronously between the multimedia sessions where the media passes through the second or third proxy server.

11. The proxy server of claim 10, wherein the third user terminal is selected from among a plurality of user terminals.

12. A method of handling session description protocol messages between user terminals in order to associate a multimedia session between a first user terminal and a second user terminal with a multimedia session between the first user terminal and a third user terminal, the method comprising:

receiving at a first proxy server a first invite message from the first user terminal for initiating a multimedia session with the second user terminal and forwarding the first invite message to the second user terminal through a second proxy server;

receiving at the second proxy server an acceptance of the first invite message from the second user terminal and forwarding the acceptance to the first user terminal through the first proxy server;

receiving at the second proxy server a request from the second user terminal to associate the multimedia session between the first user terminal and the second user terminal with a multimedia session between the first user terminal and a third user terminal and forwarding the request to the first user terminal through the first proxy server;

receiving at the first proxy server an acceptance of the request from the second user terminal to associate the multimedia session between the first user terminal and the second user terminal with the multimedia session between the first user terminal and the third user terminal and forwarding the acceptance to the second user terminal through the second proxy server;

receiving at the first proxy server a second invite message from the first user terminal for associating the multimedia session between the first user terminal and the second user terminal with the multimedia session between the first user terminal and the third user terminal and forwarding the second invite message to the third user terminal through a third proxy server; and receiving at the third proxy server an acceptance of the second invite message from the third user terminal and relaying the acceptance to the first user terminal through the first proxy server.

* * * * *